(12) United States Patent
Barcatta

(10) Patent No.: US 8,985,641 B1
(45) Date of Patent: Mar. 24, 2015

(54) EASY CONNECT

(71) Applicant: Frank August Barcatta, Fallbrook, CA (US)

(72) Inventor: Frank August Barcatta, Fallbrook, CA (US)

( * ) Notice: Subject to any disclaimer, the term of this patent is extended or adjusted under 35 U.S.C. 154(b) by 0 days.

(21) Appl. No.: 14/183,813

(22) Filed: Feb. 19, 2014

(51) Int. Cl.
*F16L 25/00* (2006.01)
*F16L 37/244* (2006.01)

(52) U.S. Cl.
CPC .................................. *F16L 37/2445* (2013.01)
USPC ............ 285/396; 285/331; 285/361; 285/402

(58) Field of Classification Search
USPC .................. 285/361, 376, 396, 402, 330, 331
See application file for complete search history.

(56) References Cited

U.S. PATENT DOCUMENTS

| | | | | |
|---|---|---|---|---|
| 4,991,882 A | * | 2/1991 | Gahwiler | 285/331 |
| 5,072,971 A | * | 12/1991 | Roman | 285/88 |
| 5,609,370 A | * | 3/1997 | Szabo et al. | 285/319 |
| 2008/0185842 A1 | * | 8/2008 | Blackman et al. | 285/376 |

* cited by examiner

*Primary Examiner* — Gregory Binda
*Assistant Examiner* — Jay R Ripley

(57) ABSTRACT

This invention is a device that is used for attaching a garden hose to a hose bib (faucet). It consists primarily of two components: an upper part which attaches to a hose bib and a lower part which attaches to the hose. The upper part has a stepped protruding tube which carries two o-rings on its circumference. The lower part has a smooth bore, particularly at the location of the o-rings; and when inserted over the upper tube, results in a pressure tight seal. The two parts are held together by a three-pronged clasp arrangement which facilitates the installation and separation of the two components. Roller bearings incorporated into the upper part and inclined ramps which are part of the lower part assist with the connection.

1 Claim, 6 Drawing Sheets

SECTION A-A

SECTION A-A

VIEW A - A

EASY CONNECT

BACKGROUND

Connecting and disconnecting garden hoses to a hose bib (faucet) or to another hose can be trying at times. Unless you have strong hands or use a wrench it is hard to get the connections tight enough so that they won't leak. Taking them off or apart is the same story, requiring strong hands or a wrench. Complicating the problem is that, with time, mineral buildup and corrosion can make them even harder to take apart. Another factor is that most hoses that one can buy nowadays have flimsy ends which become dented with normal use, further aggravating the connection problem. There are quick connectors on the market now but, unlike the Easy Connect, they suffer from many of the same problems mentioned above—usually requiring two hands for insertion or removal and becoming harder to work with time. This invention, the Easy Connect, solves all of these problems for home gardeners and professional gardeners alike by offering one-handed installation and removal and a reliable seal every time. It is fast, simple and easy to use (even Granny can do it), and it is easily maintainable. Maintenance is simple, requiring only an occasional cleaning plus an infrequent change of the sealing o-rings. Professional gardeners, for whom equipment ease-of-use, reliability, and maintainability are paramount, will want this product. Home gardeners will love the Easy Connect for the same reasons.

SUMMARY

This invention uses double o-rings to effect a seal between an inner tube and an outer tube. The two tubes are the major parts of a connector assembly that can be used to join and seal two liquid carrying elements. The principle use is envisioned to be a quick and easy connection between a garden hose and a hose bib (water faucet) or another hose. One of the tubes has a female thread on one end and, in use, is threaded to the hose bib. It is called the Upper Tube 2. The other tube, called the Lower Tube 1, has a male thread on one end which is threaded to the garden hose. The two tubes are mated together by sliding the lower part over the upper part and, with a small rotation, locking the two together. Double o-rings, captured in the body of the upper part, effect the seal between the two parts. A unique locking and unlocking mechanism is incorporated in the ends of the two parts.

FIGURES

FIGS. 5a, 5b, 5c, and 5d provide further insight into the three pronged engagement and disengagement process.

Figure 6A:
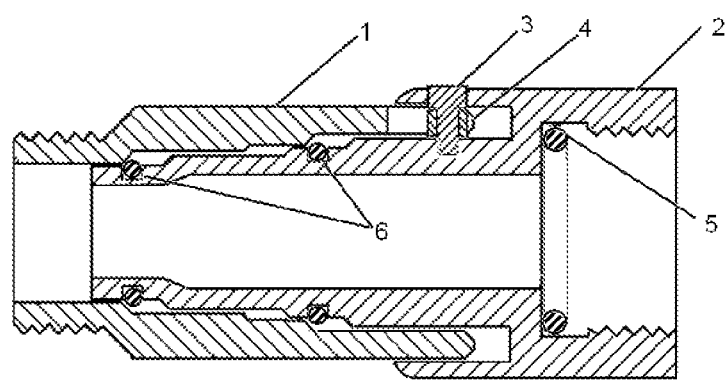
Figure 6B:
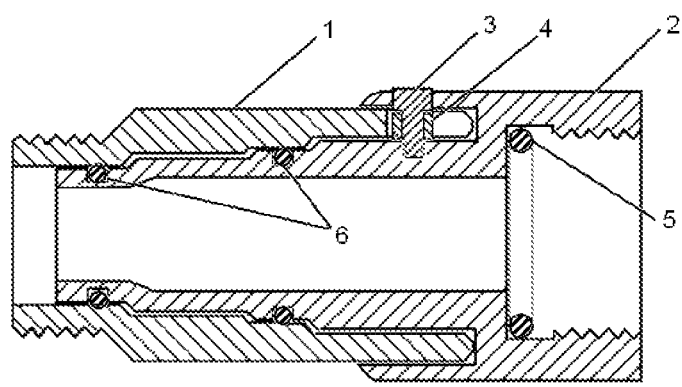

FIGS. 6a and 6b are a pair of cross sectional views which show the sealing operation that occurs during engagement.

DETAILED DESCRIPTION

This invention, the Easy Connect, is a quick connector to be used primarily to connect a garden hose to a hose bib or to another garden hose. It is simple in its design and construction, but is very effective and extremely easy to use.

Figure 1:
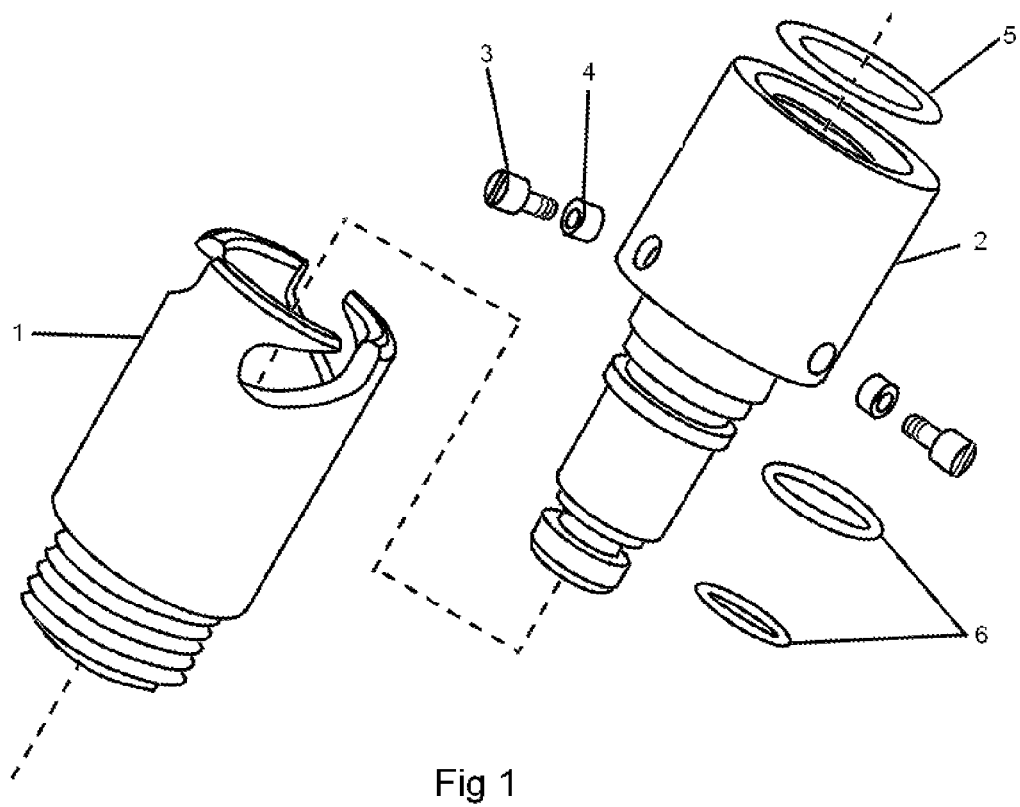
FIG. 1 shows an exploded view illustrating the relationship and orientation of the various elements comprising the unit.

FIG. 1 shows an exploded view of the various components that comprise the device. The Lower Tube 1 is a brass or stainless steel or plastic tube with a male thread on one end and a triple pronged locking ramp configuration on the other end. The locking ramp is discussed in greater detail subsequently. The Upper Tube 2, also of either brass or stainless steel or plastic, has a female thread on one end and a protruding tube with two stepped o-ring grooves on its circumference. Two Body O-Rings 6 fit in the grooves of the Upper Tube 2 to provide for enhanced sealing and alignment during engagement. Another o-ring, the Top O-Ring 5, is a standard seal used on garden hoses. The Threaded Pins 3, of which there are three per unit, thread into the Upper Tube 2 and constrain the Roller Bushings 4, also three per unit, within the body off the Upper Tube 2.

Figure 2:
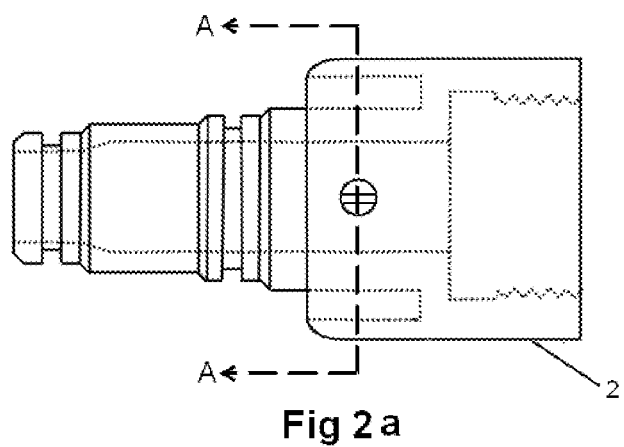
FIGS. 2a and 2b show the upper tube and orientation details related to the locking mechanism.
Figure 2:
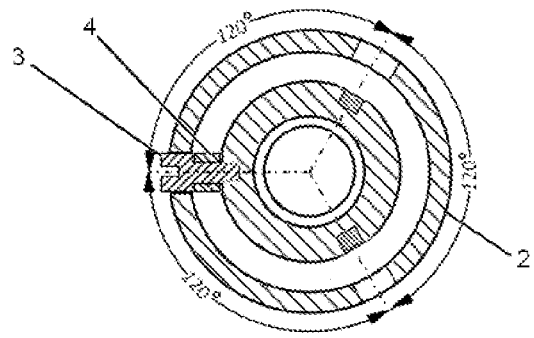

FIGS. 2a and 2b provide further details of the Upper Tube 2. Of special interest is the annular slot shown in this figure. It is within this annular slot that the Roller Bushings 4 are retained by the Threaded Pins 3. Section A-A of FIG. 2b is a cross section at the location where the Threaded Pins 3 and Roller Bushings 4 are installed. Section A-A shows the installation of one of the Threaded Pins 3 and one of the Roller Bushings 4. Clearance is provided for the Roller Bushing 4 to allow it to rotate freely. In an actual assembly pins and bushings would also be installed in the other two positions.

Figure 3:
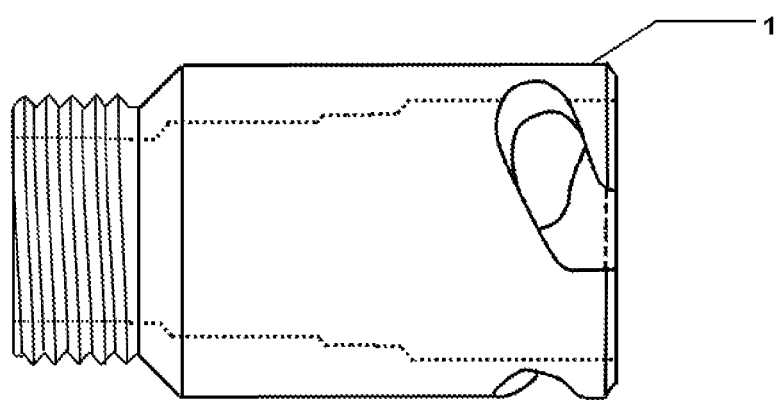
FIGS. 3a and 3b depict the lower tube and further details of the locking mechanism.
Figure 3:
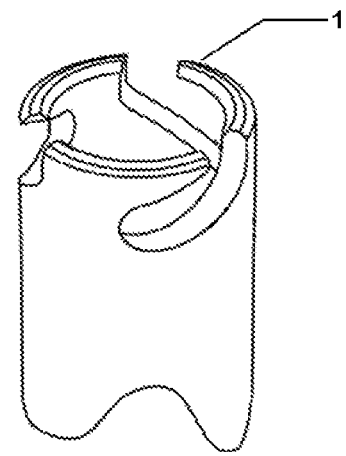

The two main units of the Easy Connect assembly—the Upper Tube 2 and the Lower Tube 1—are connected together by sliding the pronged end of the Lower Tube 1 over the protruding element of the Upper Tube 2 until the three prongs engage the three Roller Bushings 4. FIGS. 3a and 3b which provide details of the Lower Tube 1, shows the configuration of the pronged end. Once the prongs engage the rollers, a slight twist of about 40 degrees advances the Lower Tube 1 further into the annular slot of the Upper Tube 2 and completes the connection. To disconnect the assembly, a slight twist of the Lower Tube 1 in the opposite direction retracts the Lower Tube 1 somewhat from the annular slot of the Upper Tube 2 for easy removal. The purpose for the pronged-roller pin connection described above is threefold:

(1) To advance the Lower Tube 1 over the Body O-Rings 6 thereby effecting a pressure tight seal and
(2) To insure a firm connection which stays in place during use and
(3) During removal, to facilitate the removal by retracting the Lower Tube 1 thereby loosening any adhesion that the Body O-Rings 6 may have acquired with the inner bore of the Lower Tube.

Figure 4:
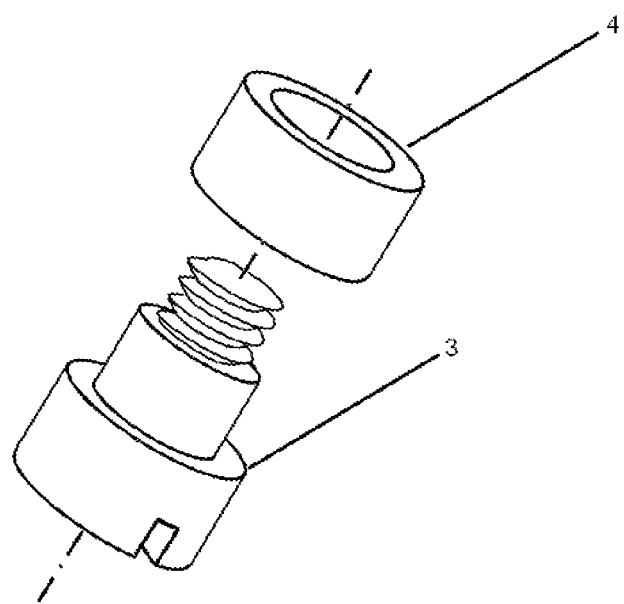
FIG. 4 shows the roller and pin details.

The Roller Bushings 4 in conjunction with the Threaded Pins 3, both depicted in FIG. 4, and acting as roller bearings, provide a near frictionless movement up and down the inclined ramps of the Lower Tube 1.

Figure 5A:
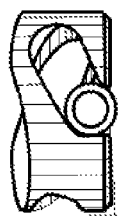
Figure 5B:
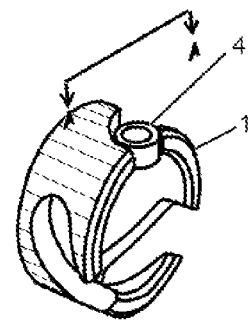
Figure 5C:
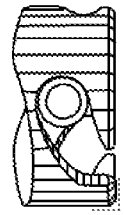
Figure 5D:
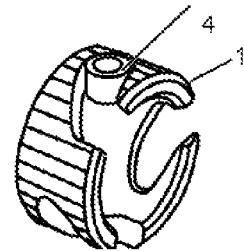

FIGS. 5a, 5b, 5c and 5d graphically depict the engagement/disengagement aspects of the pronged end of the Lower Tube 1 with the Roller Bushings 4. The Roller Bushing 4 is actually embedded within the annular slot of the Upper Tube but is shown here for clarity. FIG. 5a and FIG. 5b show the initial engagement of the pronged end with the Roller Bushing 4. A rotation of Lower Tube 1 advances it to the final sealed position as shown FIGS. 5c and 5d. A reverse rotation returns the unit to the initial unsealed condition.

FIGS. 6a and 6b present two cross-sectional views of the assembled unit to show the sealing operation and the various clearances involved. Noteworthy is the sealing of the unit as provided for by the Body O-Rings 6. In addition to enhancing the sealing capability of the Easy Connect unit, the double o-rings maintain the required clearance between the Upper Tube 2 and the Lower Tube 1, and also prevent scraping of the inner surface of the Lower Tube 1 during assembly and disassembly. FIG. 6*a* is the state of the assembly just prior to the Lower Tube 1 engaging the Body O Rings 6. FIG. 6*b* shows the final sealed state of the unit.

I claim:

1. A device for connecting and disconnecting a garden hose or similar device, comprising;
   a. a tube having a threaded connecter on one end and a three pronged clasping mechanism on the other end, the three prongs defined by three curved slots therebetween, the slots forming ramps, wherein said tube is configured to slide over another tube;
   b. said another tube being of one-piece construction and having a threaded connecter on one end and a tubular protrusion on the other end, a portion of said tubular protrusion defining an inner wall, a concentric outer wall attached to the inner wall to define an annular slot therebetween;
   c. three pins radially extending from said inner wall through said outer wall, said three pins retaining three corresponding roller bushings within said annular slot, said roller bushings acting as roller bearings;
   d. said tubular protrusion further comprising circumferential grooves, O-rings being disposed in said grooves to seal between said tube and said another tube, said O-rings guiding the mating and demating of said tube and said another tube and to maintain a clearance between the said tube and said another tube; and
   e. wherein said tube and said another tube are mated together by sliding said pronged end over said tubular protrusion and into said annular slot until said three prongs engage said three roller bushings, then twisting said tube relative to said another tube.

* * * * *